United States Patent [19]

Smisson

[11] 4,161,299

[45] Jul. 17, 1979

[54] AIRCRAFT PERFORMANCE DATA QUALIFIER

[76] Inventor: Leonard F. Smisson, 1607 W. Michigan, Midland, Tex. 79701

[21] Appl. No.: 898,166

[22] Filed: Apr. 20, 1978

[51] Int. Cl.² .......................................... B64D 43/00
[52] U.S. Cl. .................................... 244/1 R; 33/384; 33/374; 73/180
[58] Field of Search ............. 244/1 R; 73/178 T, 180; 116/124 C, 129, 126, 124.4, 117 D; 33/374, 389, 384

[56] References Cited

U.S. PATENT DOCUMENTS

| 479,803 | 8/1892 | Haise | 33/374 |
| 2,112,704 | 3/1938 | Mackay | 244/1 R |
| 2,993,281 | 7/1961 | Dock | 33/384 |
| 3,393,561 | 7/1968 | Lode | 73/180 |

FOREIGN PATENT DOCUMENTS

| 7840 of | 1911 | United Kingdom | 244/1 R |
| 249463 | 7/1926 | United Kingdom | 244/1 R |

Primary Examiner—Galen L. Barefoot
Attorney, Agent, or Firm—James A. Hinkle

[57] ABSTRACT

A method and apparatus to obtain performance data for maximum cruise economy on any particular aircraft by means of a device comprising three thin round flat disc concentrically mounted to one another. Various aircraft performance scales are imprinted upon the rotatable discs and there is provided an indicating pointer which may be set in a level position based upon the readings of the calibrated scales and based upon the throttle setting of the aircraft while in flight to give maximum cruise economy.

4 Claims, 6 Drawing Figures

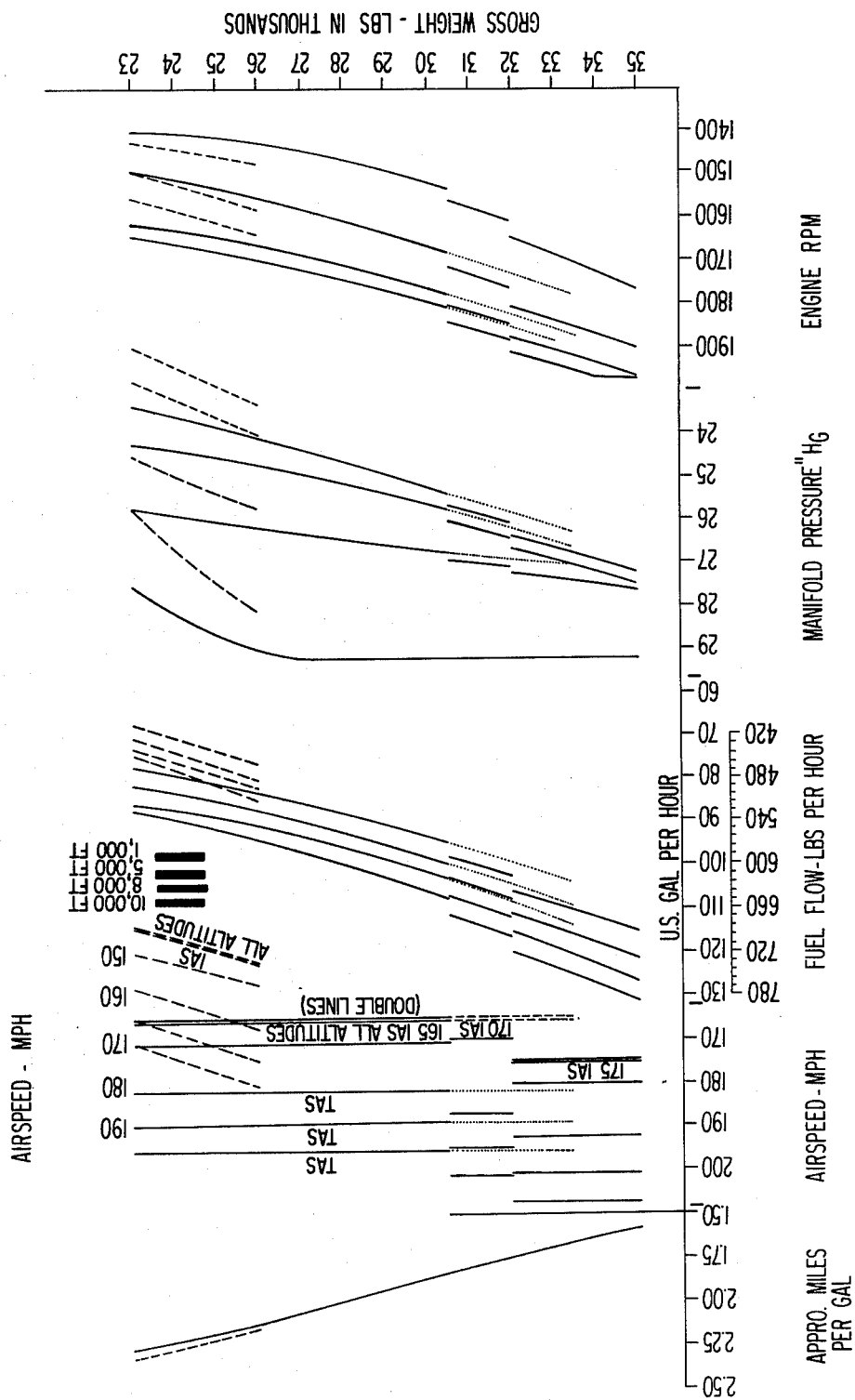

AIRCRAFT PERFORMANCE DATA QUALIFIER

BACKGROUND OF THE INVENTION

The present invention pertains to a simple approach to obtain economical cruise control for aircraft. More particularly, the invention involves a method and apparatus to obtain performance data for maximum cruise economy on any particular aircraft.

It is normal that pilots will determine the best power settings for maximum range or most economical fuel used by referring to the Performance Data Charts usually found in the aircraft owner's manual published by the aircraft manufacturer. Normally such performance data is obtained by performance test of a new or prototype aircraft and then the data is published for use with all aircraft of that particular type and model. Of course, the prototype or test aircraft was probably new and with a new or very low time engine that was still capable of producing specified engine power. Usually no two production aircraft will come off of the assembly line weighing the same or performing exactly the same as the prototype aircraft for which the performance charts were developed. Also after the aircraft is sold each owner has a different taste in equipment and some may load their aircraft down with exotic equipment, some owners may keep their aircraft waxed thereby reducing drag, or keep the engine in perfect shape capable of producing maximum power for which it was designed. Then, of course, there are those who may modify the aircraft or use it in extremely adverse conditions or pay little or no attention to weight and balance and will have more drag in flight upon the aircraft than the average aircraft of that particular model. In addition, aircraft which have not had particular maintenance performed upon it within a short period of time will not produce precisely the average power which the prototype aircraft produced when designing the performance charts. So, it can be seen that few aircraft of the same type and model will have exactly the same performance as the prototype aircraft. All of this, or course, effects the operating characteristics of each particular aircraft. Another problem with the standard performance charts supplied by the aircraft manufacturer is that the charts are seldom used because of the inconvenience of handling and reading the performance charts in a crowded cockpit, especially at night, or when in weather under instrument flying conditions. Many times these charts are difficult to interpret and require reference to a second and third chart and/or use of a computer. Because of these inconveniences and because the charts do not exactly match the aircraft in question, most pilots waste considerable fuel by not flying at the proper power setting for the conditions under which the aircraft is being operated.

SUMMARY OF THE INVENTION

Therefore, the present invention has an object to provide a simple approach to economical cruise control of an aircraft.

A further object of the present invention is to provide an apparatus to qualify the manufacturer's performance data of a given aircraft by using the apparatus to cross check the performance of the aircraft against the performance charts as published by the aircraft manufacturer.

Another object of the present invention is to provide a method for qualifying the manufacturer's performance data of a particular aircraft by using the method to cross check the performance of a particular aircraft against the performance charts as published by the aircraft manufacturer.

Yet another object of the invention is to give the pilot a simple instrument which will enable him to obtain a maximum range performance, or maximum cruise economy, to place the aircraft at a speed that will result in an attitude or angle of attack resulting in a minimum drag thereby producing a maximum economy and performance.

Other objects, advantages and capabilities of the invention will become apparent from the following description taken in conjunction with the accompanying drawings showing for purely illustrative purposes embodiments of this invention.

BRIEF DESCRIPTION OF THE DRAWINGS

FIG. 6 is a typical performance chart showing information necessary to fly a specific aircraft efficiently or at minimum drag.

DESCRIPTION OF THE PREFERRED EMBODIMENT

Figures 1, 2:
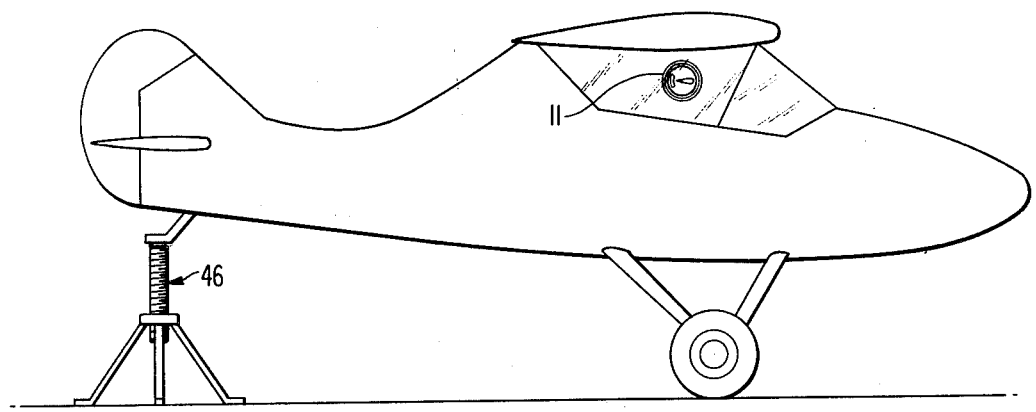
FIG. 1 is an elevation view of an aircraft shown positioned fo initial calibration and mounting of the invention.
FIG. 2 is a top view.
Figure 3:
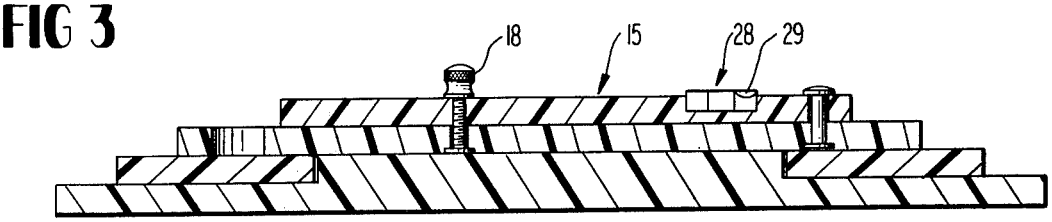
FIG. 3 is a vertical section view taken along lines 3—3 of FIG. 2.
Figure 4:
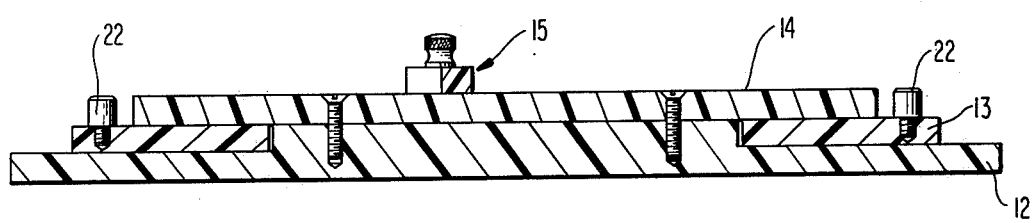
FIG. 4 is a vertical section view taken along lines 4—4 of FIG. 2.
Figure 4:
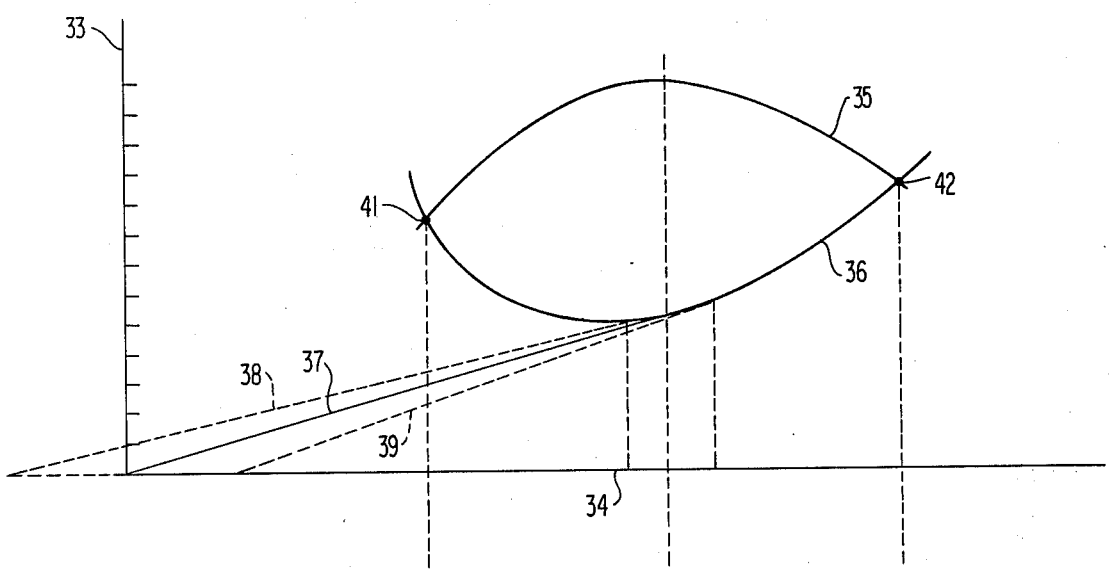

Referring to the drawings wherein like reference characters designate corresponding parts throughout the several Figures, the present invention is indicated by the numeral 11 as shown particularly in FIGS. 1 and 2. It is proposed that the Qualifier 11 would be mounted upon an aircraft such as indicated in FIG. 1 which shows the invention mounted upon the pilot's side and preferably mounted on the glass window by the pilot. However, it should be noted that the precise area for mounting should be left to the pilot and any convenient area which the invention could be attached may be utilized. On mounting, the Qualifier is to be placed so that the face of the Qualifier is parallel to the vertical axis of the aircraft with the bubble centered and the indicator means pointed at zero angle of attack. Upon installation the aircraft is to be jacked to a level attitude as required when weighing the aircraft. Normal mounting means may include such as adhesive fasteners or screw fasteners as desired.

The invention 11 comprises three relatively thin round flat discs which are concentrically mounted to one another and are rotatable with respect to each other in the manner to be described.

As can be seen in FIG. 2, the invention comprises a base scale 12, a middle scale 13 and an upper scale 14. It is desired in the configuration shown herein that the base scale 12 and the upper scale 14 be affixed with respect to one another and that only the middle scale 13 would be relatively movable with respect to the base scale and upper scale. Affixed to the upper scale 14 is an indicating pointer 15 rotatable around pivot pin 16 which is affixed to the upper scale 14. Since the indicating pointer 15 is utilized in an aircraft environment, it is desired that this particular pointer have the generalized shape of an airfoil.

The upper scale 14 has an enlarged curving aperture 17 therein which provides a slot in which a jamb nut 18 is disposed. The jamb nut 18 has on its underside a flange (which is not shown) that rides in the undercut recess 19 of the aperture 17. This prevents the jamb nut from being removed from the aperture when it is tightened in its normal mode of operation. The jamb nut then projects through a mating aperture within the indicating pointer 15 and will work in the normal mode of operation when it is desired to prevent the pointer 15 from moving. The user tightens the jamb nut causing a fractional engagement with the pointer 15 thereby preventing it from moving relative to the upper scale 14.

Also included in the upper scale 14 is a curved window 21 cut through the scale so that the middle scale 13 may be visible therethrough. Inasmuch as the middle scale 13 is movable with respect to the base scale 12 and the upper scale 14, there is provided an indexing knob 22 affixed to the middle scale 13 so that the pilot utilizing the invention may easily rotate the middle scale to perform the desired operations. The outer peripheries of the base scale 12 and the middle scale 13 are ruled as indicated by numeral 23 to show a basic circular slide rule for airmans' use. Such markings are well known in the art and are frequently used to perform various computations such as determining true air speed, figuring fuel usage and distances traveled. Since these scales and their operations are well known it is not believed that a discussion of their operation is necessary at the present time.

Looking now at window 21 as seen in FIG. 2, it will be apparent that on either side of the window and on the middle scale 13 as seen through the window several scales are printed which give particular types of information needed to operate the present invention. It is anticipated that the scale as indicated by numeral 24 will be calibrated to read in degrees celsius which will correspond to the outside free air temperature in which the aircraft is located. Etched upon the middle scale 13 in juxtaposition with the temperature scale 24 is an altitude scale 25 which is calibrated in feet corresponding to the altitude. Also etched upon the middle scale 13 on the side of the window 21 opposite the altitude scale 25 is a scale which corresponds to wind calibration and which will be scaled so as to correspond to the actual effective head or tail wind being experienced by the aircraft. Located upon the upper scale 14 in juxtaposition with the wind calibration scale 26 is a scale 27 which is calibrated for angle of attack of the aircraft in degrees.

Now referring back to the indicating pointer 15, it will be seen that along its length is a leveling bubble device 28 in which a leveling bubble 29 is free to move in the normal manner. As is customary the bubble device has a pair of centering lines 31 which indicate a level position when the bubble 29 rests between these two lines. The end of the pointer 15 opposite the pivot pin 16 is in fact a pointer which works in conjunction with the angle of attack scale 27 to enable the pilot of the aircraft to get a proper read-out of the specific angle of attack at which the aircraft is to fly for maximum cruise economy. The angle of attack as noted above will only apply at level, one "G" flight at cruise speeds. The indicating portion of the pointer 15 is shown by numeral 32.

Figure 5:
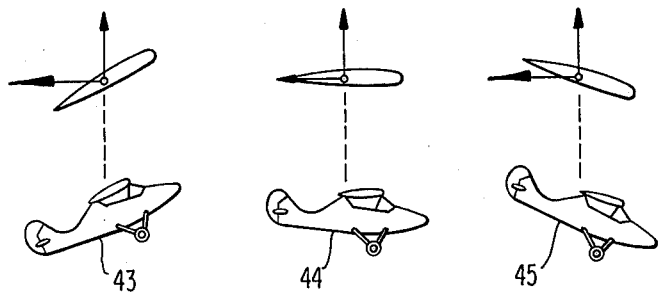
FIG. 5 is a graph showing the relationship of power, power available, power required, indicated air speed, attitude of the aircraft, drag vectors and the effect of a head or tail wind on maximum range, all at one given attitude temperature.

It has been indicated previously that each particular type of aircraft is supplied with cruise performance charts to give information necessary to fly the aircraft most efficiently or at a minimum drag attitude. A chart showing the relationship of horsepower verses indicated air speed with power required and power available curves is shown in FIG. 5. The vertical axis of this graph normally indicate a power setting which is equivalent to thrust or throttle setting. The horizontal axis is a normal indicated air speed reading. The power setting axis is indicated by numeral 33 and the air speed axis by numeral 24. The curves as shown on this particular graph shows a power available curve as shown at numeral 35 and a power required or drag curve shown at numeral 36. Other plotted values upon the graph of FIG. 5 are lines indicating no effective wind at 37 and a supposed 50 knot tail wind at 38 and a 50 knot head wind at 39. As is evident, the power curves intersect at two places shown by numerals 41 and 42. When looking at the graph of FIG. 5, the area to the left of the intersection 41 of the power curves would indicate a stall condition of the aircraft and the area to the right of the intersection of 42 of the power curve would indicate an unachievable relationship in level flight at this particular altitude and temperature, since the power available and the drag are at such points as to cancel one another out or in effect, no more power is available to propel the aircraft faster. In effect this point is the maximum speed which the aircraft may obtain in level flight at this particular altitude and temperature. To the bottom of the horizontal axis of the graph in FIG. 5, are three aircraft configurations indicating the various aircraft conditions represented upon the graph. Aircraft 43 indicates the aircraft at the stalled position, aircraft 44 indicates the minimum drag upon the aircraft at the conditions indicated and aircraft 45 shows the maximum negative angle of attack which the aircraft may achieve for normal level flight under conditions shown. The representative airfoils located above each of the aircrafts 43, 44 and 45 show the representative lift and drag components upon the airfoils for the particular configurations indicated. It should be noted that drag is at a minimum at 44 and increases at increased or decreased air speeds.

In the normal conventional approach, utilizing a chart much like that shown in FIG. 6, the pilot must interrelate between the various graphs shown, know the power available and the power required to maintain minimum drag, and then interrelate between the effective head or tail wind upon the aircraft to arrive at an indicated air speed which would give the condition of minimum drag and maximum cruise control. Obviously utilizing a chart such as the one shown would cause potential problems to the pilot when he should be exercising his attention to other areas.

In placement of the invention 11 upon an aircraft, the proper ruff placement would be accomplished much as shown in FIG. 1. As previously indicated the Performance Data Qualifier 11, would be affixed suitably to a window of the aircraft easily visible to the pilot. Inasmuch as this instrument is to be utilized during relatively straight and level flight configurations, the aircraft should be elevated by means of a suitable jack 46 to its normal straight and level flight configuration. The aircraft may be leveled as required when weighing the aircraft. These instructions, procedures and leveling points are contained in the aircraft technical instructions. At this point the indicating pointer 15 would be so positioned that pointer tip 32 would reside ruffly pointing at the mid point of window 21 and the pilot would then suitably affix the Performance Data Qualifier upon the window of the aircraft so the bubble 29 would be centered in the bubble device 28 for normal straight and level flight configuration. The Qualifier should be mounted so that its face will be parallel to the center line of the aircraft axis and also parallel to the vertical axis of the aircraft.

Now that the Performance Data Qualifier has been installed, the method of calibrating it will be as follows. It is apparent that proper calibration would be for the various altitudes which the aircraft is expected to fly and if at times the aircraft is being operated at an altitude not previously predetermined upon the Performance Data Qualifier then the pilot would interrelate between the readings he would have. Assume that for the initial qualification run the chosen altitude for flight will be at 8,000 feet. When the aircraft reaches the cruise altitude of 8,000 feet, assume for the purposes of this discussion that the free air temperature is +2° C., now take the aircraft manufacturer's performance chart for that particular aircraft and, for the purposes of this discussion, find that the true air speed for maximum range at zero wind at 8,000 feet +2° C. is 160 knots. Utilizing a common flight computer, it can be found that the 160 knots true air speed at these conditions will be 135 knots indicated air speed. If the aircraft being flown was identical to the test aircraft for which the performance charts were made, then to calibrate the Performance Data Qualifier it would only be necessary to hold 135 knots indicated air speed at 8,000 feet +2° C. in level flight and adjust the Performance Data Qualifier by moving the indicating pointer 15 to center the bubble 29 between the lines 31. Next rotate knob 22, and thereby middle scale 13, to bring the zero wind indicator in line with the pointer 15. Then mark 8,000 feet and +2° C. on the altitude and temperature scales. After several flights at different altitudes and temperatures, the Performance Data Qualifier would then be calibrated for a wide enough range to interpolate values for making it effective in normal flight ranges. The aircraft should be flown at a recommended weight and balance in order that trim drag can be reduced to a minimum. The engine power should be adjusted for the most efficient operation as necessary for stabilized cruise with bubble 29 centered. Cowl flaps and all other drag should be kept in the minimum drag position for minimun drag upon the aircraft.

The procedure just discussed would be good for an aircraft identical to the test aircraft. However, it is known that each aircraft has slightly different performance and one of the purposes of the Performance Data Qualifier is to improve upon the published performance by the manufacturer.

To calibrate the Performance Data Qualifier on any particular aircraft, the same procedure as briefly described above would be followed except that the performance data from several different air speeds above and below that show the manufacturer's performance charts will be flown to determine where the particular aircraft being qualified will cruise most economically. Assume for this discussion the same conditions as above; namely, zero wind at 8,000 feet altitude and +2° C. Assume for the purposes of calibration that the aircraft is flown at conditions enumerated at air speeds of 140 knots, 145 knots, 150 knots, 155 knots, 160 knots, and so on up through 180 knots. At each specific air speed the fuel flow and angle of attack should be carefully recorded. The next step is to compute the specific range for each air speed which may be defined as being the air speed divided by the fuel flow. For example, if the fuel flow had been 10 gallons per hour and the air speed was 160 knots then the specific range would have been 16. Then take some plain graph paper and label the left vertical axis as specific range and label the bottom horizontal axis as angle of attack with the zero angle of attack near the center and positive numbers running to the left and negative numbers running to the right from the zero angle of attack indication. Next plot the air speed against specific range and angle of attack for each air speed point. From such a plot, it will be seen that the best air speed for maximum range at zero wind under the conditions flown will be a specific air speed as calibrated. Then with the particular known best air speed from the graph as just described, it is a simple matter to go to the Performance Data Qualifier and move the middle scale 13 so that the altitude on scale 25 of 8,000 feet is aligned with the +2° C. temperature on scale 24 to match the conditions flown. Then by flying the aircraft at the indicated airspeed as determined from the just developed specific range chart, set the pointer 15 so that the bubble is centered. Next move knob 22 to bring the zero wind in line with the pointer 15 and then mark 8,000 feet opposite the +2° C. reading. The Performance Data Qualifier is now calibrated for this, and only this, condition.

Repeat this procedure until enough points are established so that interpolation can be made for any altitude/temperature situation. For flights at zero effective wind situation to attain maximum range, it is necessary only to set the altitude opposite the indicated free air temperatures, then set the pointer 15 at zero wind and adjust power to center the bubble 29.

Once sufficient points are established and calibrated the pilot needs only climb to the desired cruise altitude, feed this altitude into the computer along with the free air temperature and then throttle the aircraft either forward or back until the bubble 29 centers itself between the lines 31 and this will indicate that the aircraft is now flying at the most economical cruise condition for the particular aircraft is question.

After doing the same procedure for several altitudes, free air temperature readings and effective wind, the pilot may then record the particular readings upon the scales of his Performance Data Qualifier and be ready to fly at any particular condition to which he may desire. Once the Performance Data Qualifier has been calibrated, it is only necessary to perform three steps to reach the maximum cruise performance of the particular aircraft. The first step is to set the flight altitude opposite the temperature of the free air, then adjust for effective head wind or tail wind in the window 21 by moving the indicating pointer 15 thereby placing pointer 32 in alignment with the effective head or tail wind as shown upon the aircraft adjacent the wind calibration scale 26 and then locking the indicating pointer in a fixed position by jam nut 18. The third and final step is then to adjust the throttle until the bubble 29 centers between lines 31. Once this is done the proper maximum cruise performance is obtained in the aircraft for straight and level flight. It should be emphasized once again that this particular invention is not an angle of attack indicator, it is only an attitude indicator.

It is important that to obtain maximum cruise performance effective head or tail wind be recognized as an integral part of the problem. In order to increase range with a head wind, an increase of air speed (and power) must be used. Also in order to obtain maximum range with a tail wind, power must be reduced with the equivalent reduction of air speed. Therefore, a suitable wind correction for effective head and tail wind must be shown on scale 26 of the middle scale 13.

Calibrations for compensation for head or tail winds is a simple computer problem that will be different for each aircraft. An effective wind chart can be constructed from performance data contained in the pilots handbook and from calibrations made by flying the aircraft at the increased or decreased indicated air speeds for a given effective head or tail wind. Next fly the aircraft at such increased (or decreased) air speed with the Qualifier set up for zero wind, move the bubble 29 until it is centered, now mark the effective wind scale for this condition. Any correction for maximum range as developed in the specific range chart and a calibration should be added or substracted from the air speeds as developed above for effective head or tail winds.

Various modifications may be made of the invention without departing from the scope thereof and it is desired therefore that only such limitations shall be placed thereon as are imposed by the prior art and/or set forth in the appended claims.

What is claimed is:

1. A calibrated apparatus to obtain performance data for maximum cruise economy on aircraft and wherein the apparatus is mounted on the aircraft for viewing by the crew thereof, said apparatus comprising, a plurality of relatively thin, round, flat discs mounted concentrically with one another about a center point, said discs being rotatable with respect to one another, said rotatable concentrically mounted discs comprising an upper disc, a middle disc and a base disc, the upper disc and base disc being fixed to one another with the middle disc being rotatable with respect to the upper and base discs, indicating means positioned on the upper disc and being movable across the surface of said upper disc, the indicating means having a proximal end and a distal end wherein the proximal end is pivotally engaged with the upper disc, leveling means integral with the indicating means wherein said leveling means comprising a leveling bubble, the upper disc having an elongated aperture therethrough at a fixed radius from the center point, indicia means located in juxtaposition with said elongated aperture, said indicia means indicating a first set of flight parameters of the aircraft, the middle disc having indicia means located thereupon in cooperative relationship with the elongated aperture of the upper disc for viewing through said elongated aperture at predetermined times when said elongated aperture is positioned in juxtaposition with the middle disc, indicia means imprinted on the middle disc at a fixed radius from the center point adapted for viewing through said elongated aperture, said indicia means indicating a second set of flight parameters, the indicating means movable with respect to the elongated aperture of the upper disc and adapted to point to various indicia of the upper and middle disc, whereby to obtain maximum cruise economy using the previously calibrated apparatus the crew climbs the aircraft to a designated altitude and enters the first set of flight parameters, then enters the second set of flight parameters, then adjusts the indicating means to a predetermined setting relative to the second set of flight parameters, then adjusts power of the aircraft until the leveling bubble centers thereby indicating a condition of maximum cruise economy.

2. The apparatus as claimed in claim 1, wherein the indicia means of the upper disc comprising temperature and angle of attack calibrations.

3. The apparatus as claimed in claim 2, wherein the indicia means of the middle disc comprising wind and altitude calibrations.

4. The method of obtaining performance data for maximum cruise economy on a aircraft utilizing a computer instrument mounted on an aircraft for viewing by the flight crew thereof, the instrument having three flat discs mounted concentrically about a center point and rotatable with respect to one another, an indicating means positioned on the first of said discs and being movable across the surface of said first disc, leveling bubble means integral with the indicating means, the first disc having an elongated aperture therethrough with indicia means located in juxtaposition with the elongated aperture indicating a first set of flight parameters of the aircraft, the second of said discs having indicia means located thereupon in cooperative relationship with the elongated aperture of the first disc for viewing through said elongated aperture at predetermined times, said indicia means indicating a second set of flight parameters, the indicating means movable with respect to the elongated aperture of the first disc and adapted to point to various indicia of the first and second discs, the method com-rising the steps of, flying at a predetermined altitude with known relative wind and temperature, recording at selected air speeds of the aircraft the fuel flow and angle of attack, computing specific range against angle of attack, plotting air speed against specific range and angle of attack for each air speed point, determining from the plot the best air speed for maximum range of said aircraft, transferring the plotted points to the computer instrument, setting the first disc relative to the second disc to show current free air temperature and altitude, setting the indicating means to the effective relative wind, centering the bubble of the leveling means by power increases or reductions of the aircraft, thereby indicating maximum cruise economy.

* * * * *